Aug. 8, 1939.　　　C. E. MUSGRAVE　　　2,168,624
AUTOMOBILE LIFT PLATFORM
Filed Dec. 30, 1937
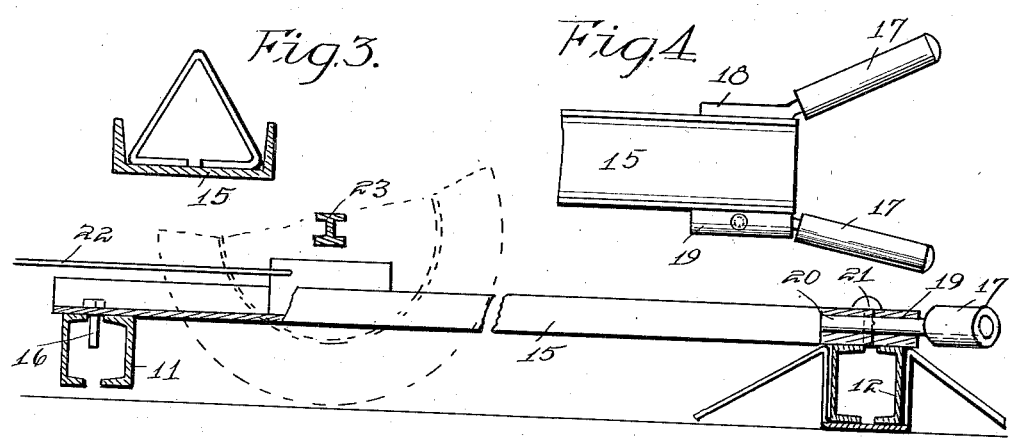
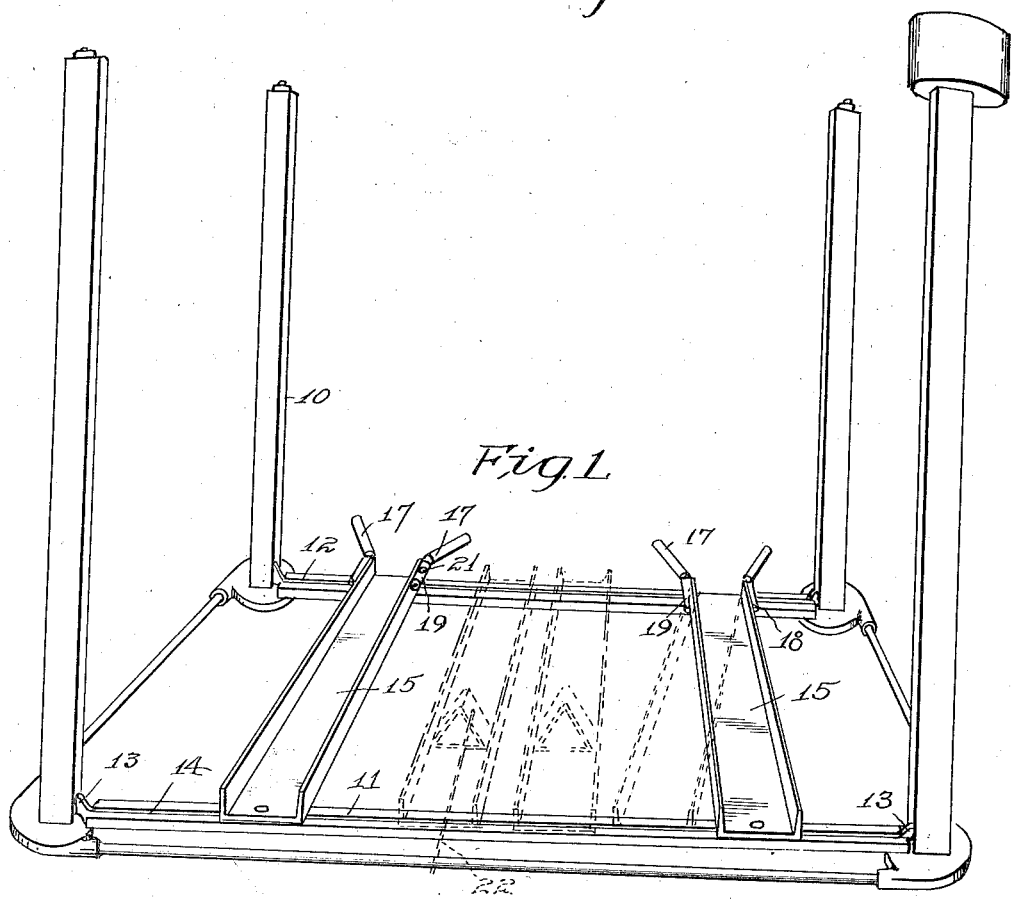
Inventor
C. E. Musgrave Patented Aug. 8, 1939

2,168,624

UNITED STATES PATENT OFFICE 2,168,624

AUTOMOBILE LIFT PLATFORM

Claude E. Musgrave, Cedar Rapids, Iowa, assignor to Globe Hoist Company, Des Moines, Iowa, a corporation of Iowa Application December 30, 1937, Serial No. 182,510

7 Claims. (Cl. 254—89)

My invention relates to the art of automobile lifts, and my object is to provide a lift platform and wheel runways which, when in use, will afford a maximum of working space for an operator upon the underside of an automobile on the platform.

A further object is to provide a structure of this class in which the wheel runways are readily, quickly and easily adjustable laterally to spaced apart position to receive all of the various automobile wheels now in use.

A further object is to provide improved means for guiding automobile wheels into the wheel runways, and in this connection to provide means for readily, quickly and easily adjusting the device to receive duplex automobile wheels.

A further object is to provide a device of this character in which the operator may readily, quickly and easily adapt the device for supporting an automobile from the axle thereof to permit removal of the automobile wheels.

In the accompanying drawing

Figure 1 shows a perspective view of a lift frame and my improved lift platfrom and wheel runways in position therein. The dotted lines show the runways in various adjusted positions and also the position of the axle-engaging jacks in the wheel runways.

Figure 2 shows a vertical longitudinal sectional view through the platform beams and a wheel runway mounted thereon, parts of which are broken away to show structural details, and also showing an axle jack in the runway and an automobile axle adjacent thereto.

Figure 3 shows a transverse sectional view of one of the wheel runways and an axle supporting jack thereon; and Figure 4 shows a plan view of one end of a wheel runway illustrating the roller wheel guides.

Referring to the accompanying drawing I have used the reference numeral 10 to indicate generally the automobile lift frame. I have not illustrated same in detail as it forms no part of my present invention. I have, however, shown it to be of the four upright post type.

My improved platform comprises two transverse structural metal end beams 11 and 12, each of which has a bracket 13 at each end projected into the adjacent corner post, and means, not shown, are provided for jointly raising and lowering these brackets. In this construction it is unnecessary to provide any longitudinally arranged platform beams, and this gives a maximum of accessibility to the under side of an automobile on the platform.

The beam 11 is provided with a longitudinally arranged slot 14 for purposes hereinafter made clear.

The wheel runways are each formed of a structural metal channel bar 15 with its flanges extended upwardly, at one end there is a pivot pin 16 extended downwardly through the wheel runway and into the slot 14 through which it may freely slide longitudinally of the beam 11.

At the opposite end of each runway I have provided two wheel guide rollers 17, one of which is mounted upon a shaft 18 which is fixed to the adjacent side flange of the wheel runway. On the outer surface of the opposite side flange I have fixed a sleeve 19 into which the end portion 20 of the roller shaft may be detachably inserted and held by a detachable pin 21. These rollers incline outwardly away from each other as shown in Figure 4.

In some instances it is desirable to support an automobile upon its axles to provide for the removal of the automobile wheels and to provide easy accessibility to the under side of an automobile. My improvement is especially adapted for such purposes because the wheel runways are free to be moved laterally and there are no longitudinal platform beams. I have provided two axle-engaging jacks 22, triangular in outline and of a size to be slidingly fitted between the flanges of the runway, as shown in Figure 3, with a narrow top edge for engaging an automobile axle. In Figure 2 an automobile axle 23 is shown in position directly above the jack. I also preferably provide a handle rod 24 applied to the jack.

In practical operation, and assuming that the platform is lowered, the operator stationed at the end of the lift upon which the automobile is to be driven, moves one or both of the adjacent ends of the wheel runways to position where they will be spaced apart substantially the same distance as the automobile front wheels are spaced. This is quickly and easily done because the adjacent ends of the wheel runways simply rest upon the top edge of the frame member 12. The operator need not adjust the opposite ends of the wheel runways. When an automobile is driven toward the wheel runways its wheels will first engage the roller guides, which will cause the runways to move laterally to properly spaced positions relative to the automobile wheels, then as the automobile wheels move over the wheel runways they will engage the upright flanges of the wheel runways and thereby move them laterally into alignment with the automobile wheels.

During all of these movements the pins 16 prevent longitudinal movement of the wheel runways. Hence, the operator need only approximately position the adjacent ends of the wheel runways and thereafter they are automatically and accurately spaced by the automobile wheels.

To accommodate my device to motor vehicles having duplex tires I remove the pin 21 and the adjacent roller guide. When this has been done the remaining roller guide will serve to direct the wheel into the wheel runway, and the mating duplex wheel may stand outside of the wheel runway.

In practice I have found that by the use of my improved rolling wheel guides an automobile wheel may be driven toward the wheel runway at an angle considerably divergent from the longitudinal center of the runway, and when the wheel engages the roller the wheel runway will be moved toward a centered position in front of the wheel and the wheel will not ride over the roller. Heretofore, ramps having high and wide side flanges have been used for this purpose. I have found that with said flanges, if they are made high enough to prevent tires from riding over them, they must be high enough to engage portions of an automobile and, hence, the practicable height thereof is limited and when so limited, the automobile wheels in some instances will ride over them. With my improved roller guide one roller may be easily removed for use with duplex tires, and this would not be practicable with the ordinary ramp flanges.

My improvement also readily adapts itself to the use of axle-engaging jacks of the kind shown, because they can be readily and easily inserted between the flanges of the wheel runways and adjusted longitudinally thereof, and the runways themselves can be readily and easily moved laterally upon the platform end beams to position the jacks at any desired point relative to the automobile axle.

I claim as my invention:

1. An improved automobile lift platform, comprising two transverse platform end members and two wheel runways mounted thereon, and means for pivotally and slidingly connecting one end of each runway with the adjacent end platform member upon which it is mounted.

2. An improved automobile lift platform, comprising two transverse platform end members, a wheel runway mounted on said platform end members and freely movable thereon, a pivot pin at one end of the wheel runway for pivotally connecting it to the platform end member, and means for movably connecting the pivot pin with the adjacent platform end member for movement longitudinally of said platform end member.

3. An improved automobile lift platform, comprising two transverse platform end members, one of said platform end members being formed with a longitudinal slot, a wheel runway resting upon said platform end members and movable thereon, and a pivot pin extended through one end of the wheel runway and into said slot, for the purposes stated.

4. An improved automobile lift platform, comprising two transverse platform end members and two wheel runways mounted thereon, said wheel runways being supported upon said end members for free lateral sliding movement, and means for preventing longitudinal movement of the runways upon the end members.

5. An improved automobile lift platform, comprising two transverse platform end members and two wheel runways mounted thereon, said wheel runways being supported upon said end members for free lateral sliding movement, means for preventing longitudinal movement of the runways upon the end members, and means for causing an automobile wheel to move one of said wheel runways laterally upon the end members, said means comprising two guide devices fixed to one end of the wheel runway and extended outwardly beyond the end of the runway in divergent directions.

6. An improved automobile lift platform, comprising two transverse platform end members and two wheel runways mounted thereon, said wheel runways being supported upon said end members for free lateral sliding movement, means for preventing longitudinal movement of the runways upon the end members, means for causing an automobile wheel to move one of said wheel runways laterally upon the end members, said means comprising two guide devices fixed to one end of the wheel runway and extended outwardly beyond the end of the runway in divergent directions, and rollers on said guide devices.

7. An improved automobile lift platform, comprising two transverse platform end members and two wheel runways mounted thereon, said wheel runways being supported upon said end members for free lateral sliding movement, means for preventing longitudinal movement of the runways upon the end members, means for causing an automobile wheel to move said wheel runways laterally upon the end members, said means comprising two guide devices fixed to one end of each wheel runway and extended outwardly beyond the end of the runway in divergent directions, and rollers on said guide devices.

CLAUDE E. MUSGRAVE.